C. J. Holman,
Making Staves.

N° 51,896.                    Patented Jan. 2, 1866.

2 Sheets, Sheet 1.

Witnesses:
Geo. B. Nichols
A. J. Snow

Inventor:
Calvin J. Holman

C. J. Holman,
Making Staves.
Nº 51,896. Patented Jan 2, 1866.

Witnesses:
Geo. B. Nichols
F. J. Snow

Inventor:
Calvin J. Holman

UNITED STATES PATENT OFFICE.

CALVIN J. HOLMAN, OF OSHKOSH, WISCONSIN, ASSIGNOR TO SPARROW M. NICKERSON, OF CHICAGO, ILLINOIS.

IMPROVEMENT IN MACHINES FOR SAWING STAVES.

Specification forming part of Letters Patent No. 51,896, dated January 2, 1866.

*To all whom it may concern:*

Be it known that I, CALVIN J. HOLMAN, of Oshkosh, in the county of Winnebago and State of Wisconsin, have invented a new and useful Improvement in Machines for Sawing and Planing Barrel-Staves; and I do hereby declare that the following is a full, clear, and exact description of the same, reference being had to the accompanying drawings and the letters and figures marked thereon, which form part of this specification.

The nature of my said invention consists in a novel arrangement of the saw for sawing the staves, with the interior supports thereof, whereby said saw can be readily braced and adjusted so as to give it strength and accuracy in its operation; and also in so combining a device for sawing the staves with another for planing them in one machine that the sawing and planing the staves are accomplished much more readily and rapidly, while at the same time the attendance of one man less is required than in ordinary machines.

To enable those skilled in the art to understand how to construct and use my invention, I will proceed to describe the same with particularity, making reference in so doing to the aforesaid drawings, in which—

Figure 1:
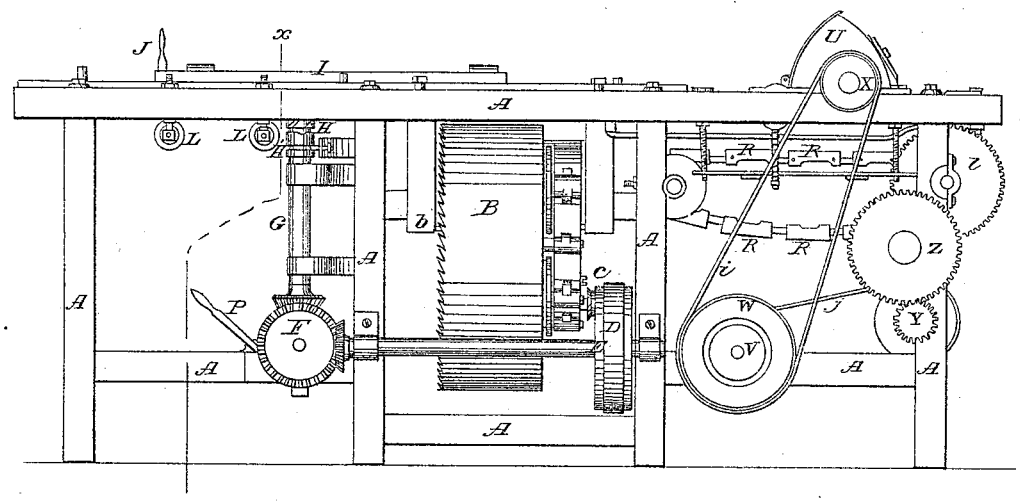
Figure 2:
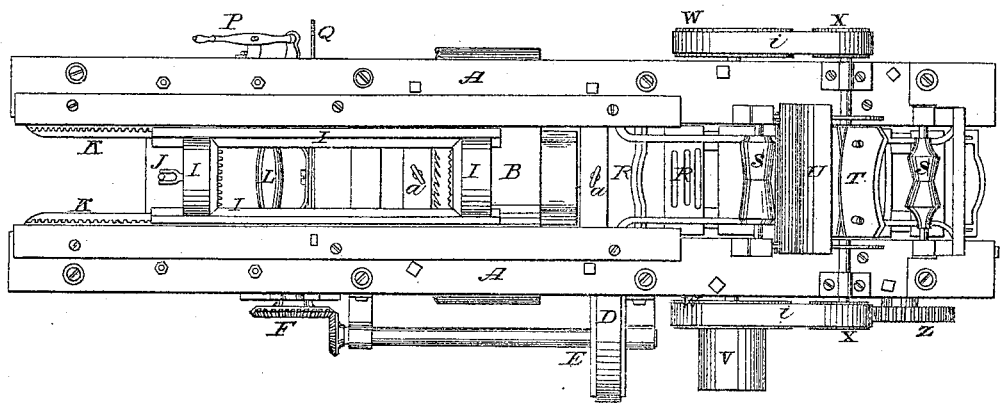
Figure 3:
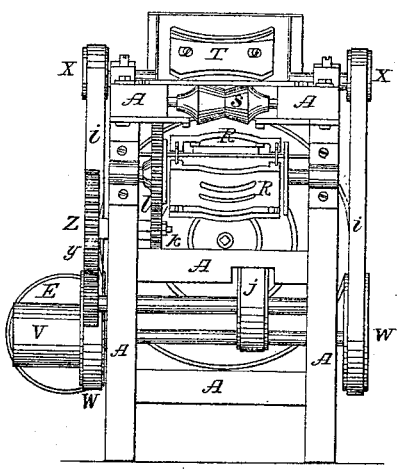
Figure 4:
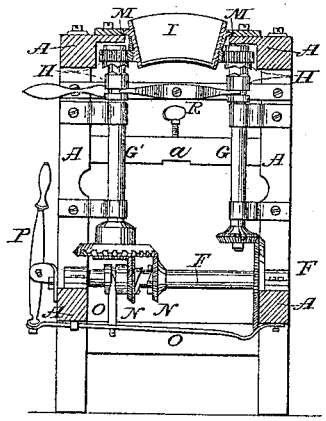
Figure 5:
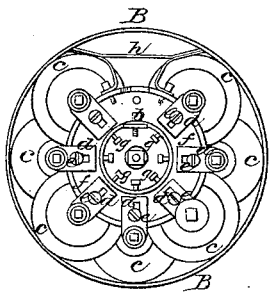

Figure 1 represents a side elevation of my invention; Fig. 2, a plan or top view of the same; Fig. 3, a right-hand end elevation thereof; Fig. 4, a transverse sectional view at the line $x$ in Fig. 1; Fig. 5, an end view of the saw for sawing the staves; and Fig. 6, a side view of the same, part of the saw-plate being broken away, disclosing the interior supports.

Similar letters of reference in the different figures denote the same parts of my invention.

A represents the frame of the machine which forms the support of the operating parts thereof.

B represents the saw for sawing the staves, which is constructed by bending the plate so as to form the convex surface of a cylinder having its teeth upon one end, as shown, supported within and attached to the frame of the machine, as hereinafter more fully described. The requisite rotary motion is imparted to this saw by means of a belt passing around it and any suitable shafting operated by the power used for that purpose. By means of the peculiar interior arrangements the revolution of said saw B imparts a rotatory motion to the shaft or drum, (marked C,) which, by means of the belt D and drum upon the shaft E, revolves said last-named shaft, which, by means of the beveled gearing at F, revolves the upright shafts G G', as seen in Fig. 4. The upper ends of said vertical shafts revolve in a box upon which there is arranged a spur-gearing, (marked H',) which spur-wheels H' H' gear into a toothed rack (marked K in Fig. 2,) secured to each side of the carriage I, which is supported in suitable grooves in the frame, as shown at M M in Fig. 4, J being a lever attached at its lower end to an adjustable dog used to hold the block of wood firmly in place while being sawed.

At the upper part of the shafts G G', just below the spur-wheels H' H' aforesaid, are the clutches marked H H, which are operated by the lever Q, pivoted or fulcrumed at R. When the handle Q is forced downward the clutch H upon the shaft G is thrown into gear with the box H' of said shaft, so that said spur-wheel, thereupon revolving with the box, moves the carriage back so that its front end lies back of the edge of the saw, and by rais ig said handle Q up the clutch upon the shaft G is disengaged and the clutch upon G' is thrown into gear with H' upon said shaft G', and in like manner moves the carriage forward so as to saw the block thereupon, as desired. The said shafts G and G' revolve all the time, the alternate movements of the carriage being accomplished by the clutches H, as above set forth. Upon the lower end of the shaft G' there are two gearings upon the bevel-wheel there shown, so that by means of the lever P, slide O, and arm O', and the adjustable bevel-wheel N', the feed-motion of the carriage may be regulated as desired.

From the configuration and arrangement of the saw B, as the carriage is moved forward the staves are sawed from the block successively, having the proper curve, so that when set up the barrel is in form a true circle, and as they pass from the saw they rest upon the endless apron, (marked R,) pass on beneath the rollers S and planer T, as desired, issuing at the end of the machine complete.

The operation of the planing arrangement, or the means by which it is operated, is as follows: V represents a drum upon the end of a shaft arranged transversely with respect to the machine, having supports or bearings in the frame at each side, around which drum a belt passes connected in any suitable manner with the driving-power. Upon each end of said shaft there are the drums W, around which and the drums X upon the shaft of the planer T the belt $i$ passes, so that the revolution of the drum V revolves the planer T, U being a cap or shield over the same to prevent the shavings from being scattered around the machine. There is also upon the same shaft with the drums W, at about the middle of the shaft, another drum, around which and the drum upon the shaft of the spur-wheel Y the belt $j$ passes, and thus the revolution of the said first-mentioned shaft revolves the said spur-wheel Y and the wheel Z gearing into the same, while another spur-wheel, $k$, upon the shaft of the wheel Z engages with the gear-wheel $l$, which is arranged upon the same shaft with the pulleys or wheels, which support the chain or endless carriage R, which carries the staves under the planer.

The rollers S S (seen in Figs. 2 and 3) are supported upon or in adjustable or yielding bearings, (seen at $m$ in Fig. 1,) so as to adapt the same to the staves passing between them and the carriage R.

It will be observed that the arrangement of the endless carriage R is such with respect to the saw B that as the stave passes from the saw it rests upon the said carriage, and is thus carried on through the planer automatically without any care from the attendant whatever, and thus, the blocks having been previously sawed into proper lengths for staves, a single attendant can manage the entire machine.

I will now describe with particularity the arrangement within the saw B for strengthening and sustaining the same, and also for imparting motion to the carriage I, as aforesaid.

Figure 6:
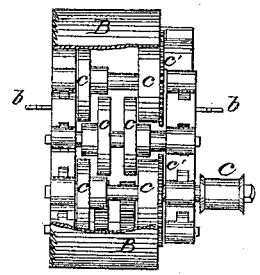

$c$ represents a series of rollers arranged in pairs upon suitable shafts, which have their supports at each end in the circular or annular plates, (marked $f$,) as shown and hereinafter specified. The said annular plates are attached on the lugs $b$ $b$ or otherwise to suitable cross-beams upon the frame of the machine, at $a$ $a$, by means of screws, as shown, or in any other suitable manner. The shafts of the said rollers $c$ have their immediate bearings in the adjustable blocks $d$, provided with a slot, as shown, through which a set-screw passes to secure said adjustable bearings $d$ to the plates $f$. Through a projecting ring upon said plates $f$ there is a set-screw, $g$, arranged against the end of each of the said adjustable bearings $d$, so that by loosening the set-screws $e$ said bearings may be moved outward so as to press the rollers $c$ against the interior surface of the saw-plate, and as each bearing has a separate and independent adjustment the proper and uniform pressure of the rollers is readily obtained. These rollers have a leather or other covering, so as to insure their revolving when the saw is put in motion, as aforesaid, by a suitable belt passing around the same. The shaft of one pair of said rollers $c$ is prolonged, as shown in Fig. 6, so as to receive the drum C, and as the shafts revolve with the wheels to impart motion to the shaft E and operate the carriage I. Upon one edge of the rollers farthest from the toothed edge of B are flanges, (marked $c'$ in Fig. 6,) to prevent the saw from being forced off from its supports by the pressure of the block which is being sawed.

$h$ represents a table or platform arranged within the saw and attached to the plates $f$, as shown, for the stave to rest upon while passing through.

Having described the construction and operation of my invention, I will now specify what I claim and desire to secure by Letters Patent—

The arrangement in one machine of the carriage I, saw B, endless carriage R, rollers S, and planer T, arranged and operating substantially as and for the purposes herein set forth.

CALVIN J. HOLMAN.

Witnesses:
  W. E. MARRS,
  GEO. B. MICHOLS.